Feb. 10, 1942.  G. C. PAXTON  2,272,427
PACKING STAND
Filed March 22, 1941  2 Sheets-Sheet 1
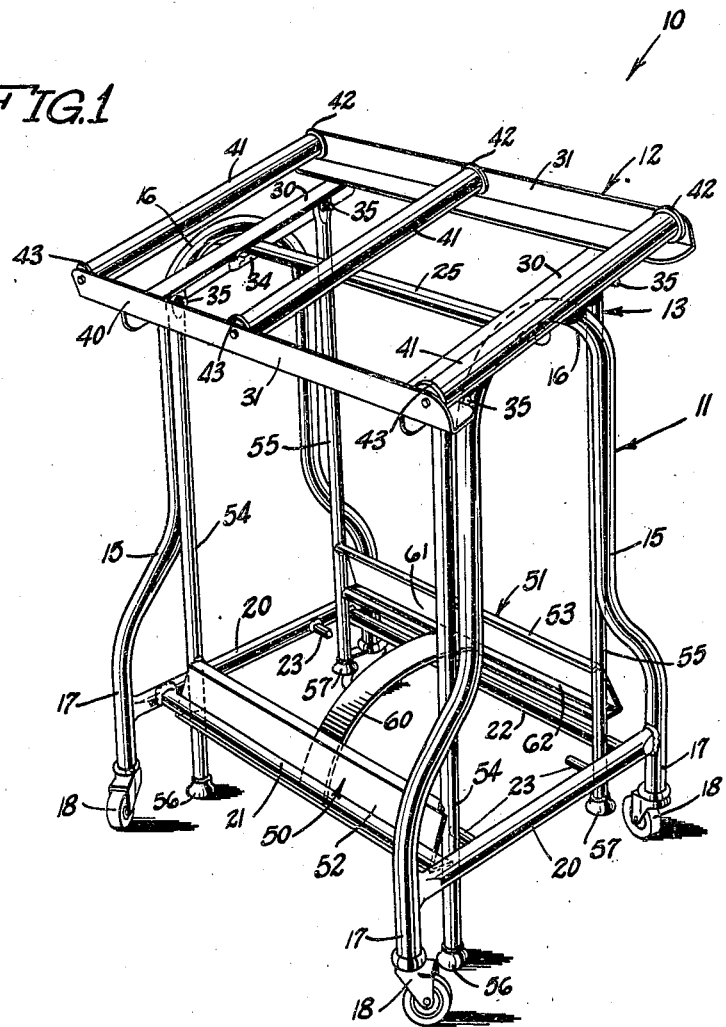
INVENTOR:
GERALD C. PAXTON
BY
ATTORNEY Feb. 10, 1942.   G. C. PAXTON   2,272,427
PACKING STAND
Filed March 22, 1941   2 Sheets-Sheet 2
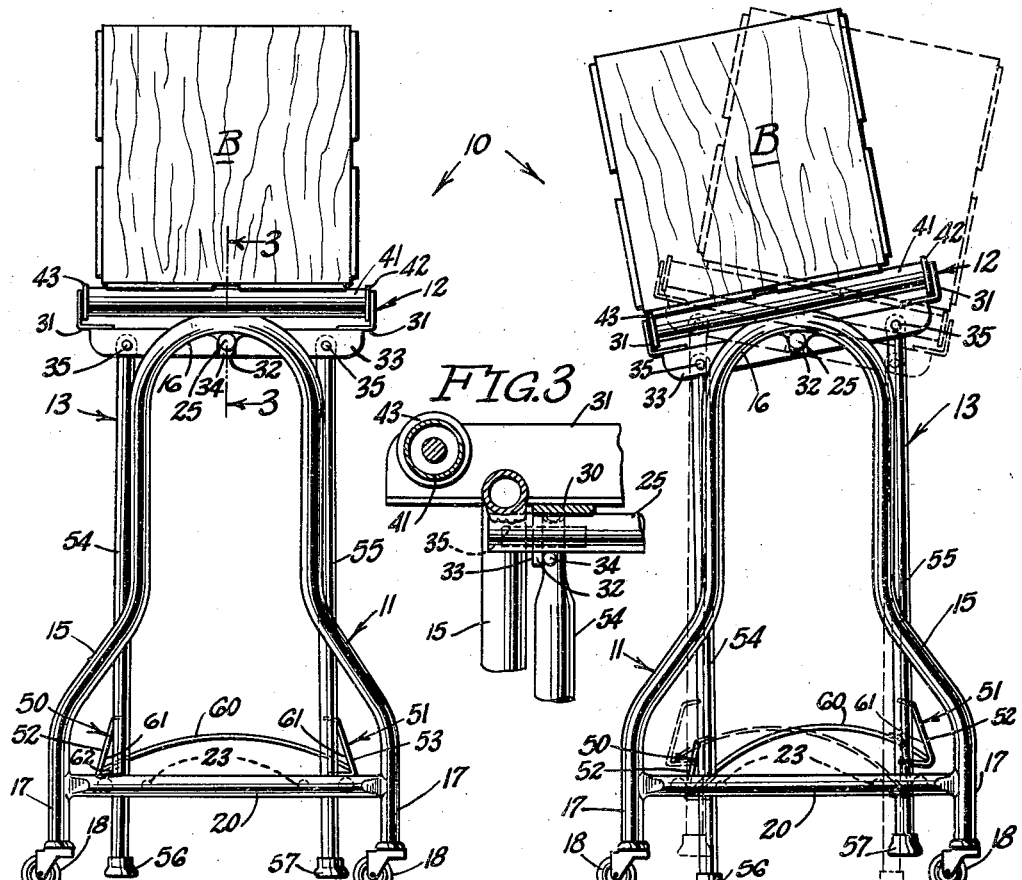
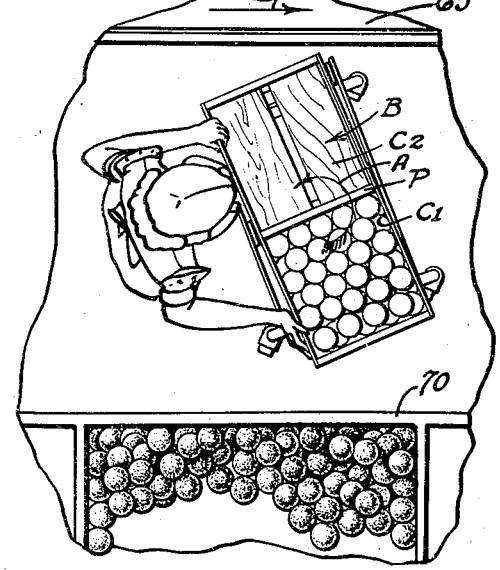
INVENTOR:
GERALD C. PAXTON
BY
ATTORNEY Patented Feb. 10, 1942

2,272,427

UNITED STATES PATENT OFFICE 2,272,427

PACKING STAND

Gerald C. Paxton, Riverside, Calif., assignor to Food Machinery Corporation, San Jose, Calif., a corporation of Delaware Application March 22, 1941, Serial No. 384,771

7 Claims. (Cl. 248—140)

This invention relates to the art of manually packing shipping cases with food products and the like as practiced in the fruit and vegetable industries.

The greater portion of apples, oranges, and similar fresh fruits which are shipped commercially are wrapped and packed in wooden shipping containers in their preparation for shipment. This packing has to be done manually and the work is facilitated by providing packing stands for supporting the boxes in convenient positions while they are being packed.

It is an object of this invention to provide a novel and improved packing stand for the general purpose above pointed out.

Citrus fruits are commonly packed in wooden boxes which are divided into two sections by a transverse central partition. In packing this kind of box, the operator fills one section at a time, that section, while being filled, being turned toward the bin from which the fruit is taken.

It is an object of the present invention to provide a packing stand for holding boxes to be packed which will facilitate the turning of the box after one end thereof has been packed with fruit, to position the other end thereof adjacent the fruit bin.

The manner of accomplishing the foregoing objects, as well as further objects and advantages, will be made manifest in the following description taken in connection with the accompanying drawings, in which:

Fig. 1 is a perspective view of a preferred embodiment of the invention.

Fig. 2 is an end elevational view of the packing stand shown in Fig. 1 with the conveyor section thereof in a level position and supporting a box.

Fig. 3 is an enlarged, detailed fragmentary sectional view taken on the line 3—3 of Fig. 2.

Fig. 4 is a view similar to Fig. 2 with said conveyor section tilted laterally and supporting a box in packing position thereon, this view showing in dotted lines the position of said conveyor section when tilted in the opposite direction.

Fig. 5 is a diagrammatic plan view illustrating the ease with which the stand of my invention, with a box resting thereon and with one section packed, may be rotated in order for the packer to start packing the other section of the box.

Referring specifically to the drawings, the packing stand illustrated therein is designated by the numeral 10, and includes a frame 11 which supports a conveyor section 12, the position of the latter with respect to the frame being determined by a control mechanism 13.

The frame includes two inverted U-shaped members 15, each of which includes arches 16 and legs 17. The upper portions of these legs are fairly close together, while their lower ends are spread apart to give a wide base for the frame. Fitted to the lower ends of the legs 17 are casters 18. The U-shaped members 15 are preferably formed of tubular material and the legs 17 thereof are connected by tubes 20 and the latter are connected together by tubes 21 and 22. Provided on the tubes 20 are short pins 23 which extend inwardly therefrom.

The arches 16 of the U-shaped frame members 15 are connected together by a solid pivot bar 25, the opposite extremities of which are welded to lower faces of the arches 16 at the topmost extremities of the latter. It is thus seen that the end members 15 are welded together and rigidly united by the longitudinal tubes 21 and the longitudinal pivot bar 25.

The conveyor section 12 includes two angle iron cross members 30 to the upper faces of the outer ends of which are welded longitudinal angle irons 31. Each of the angle irons 30 has a vertical notch 32 formed upwardly in the vertical flange 33 thereof, this notch being adapted to receive the pivot bar 25, the latter being retained in these notches by short rods 34 welded across the notches 32.

Provided on the vertical flanges 33 so as to extend inwardly therefrom, are pivot pins 35.

Pivotally mounted at their opposite ends on vertical flanges 40 of the longitudinal angle irons 31, are idle conveyor rollers 41, each of these rollers having narrow radial flanges 42 formed on their ends along one side of the packing stand 10, and radial flanges 43 formed on their ends along the opposite side of the packing stand 10.

The control mechanism 13 includes a pair of latch frames 50 and 51 which have beveled latches 52 and 53 respectively, each of these latches being formed of sheet metal. The latches 52 and 53 are welded at their opposite ends to table locking legs 54 and 55, the upper ends of which are pivoted by the pins 35 to the conveyor section 12, and the lower ends of which are provided respectively with rubber friction shoes 56 and 57.

The packing stand 10 is assembled so that the legs 54 and 55 lie between the pins 23 and the tubes 21 and 22, thereby limiting the swinging movement of the frames 50 and 51 about the pins 35. The frames 50 and 51 are yieldably pushed apart by a leaf spring 60 which extends into the recesses 61 provided by the contour of the sheet metal latches 52 and 53. The spring 60 is retained in position by a piece of sheet metal 62 lying in one of the recesses 61 and welded centrally to the adjacent end of the spring 60.

Operation

The packing stand 10 of my invention is operated as follows:

Figs. 1 and 4 show the stand positioned as it is when it is used for supporting a box while the packer is actually placing fruit in the box—that is, the conveyor section 12 is tilted laterally so that the box resting on the conveyor section is also tilted toward the packer. In these views, the side of the conveyor disposed downwardly is that in which the flanges 43 are located so that a box B resting on the rollers 41 slides downwardly against these flanges. To position the conveyor section 12 thus, the latch 52 must be pushed inwardly from over the tube 21, and then downwardly until the shoes 56 come in contact with the floor. The legs 54 now support the low side of the conveyor section 12 and prevent this tilting farther downwardly about the pivot bar 25 when a box of fruit is placed on the stand. The contact of the shoes 56 with the floor acts as a brake to prevent the stand rolling on the casters 18 and thus changing its position. Once the stand is located as shown in Figs. 1 and 4, the packer may devote her entire attention to packing fruit from a bin 70 (see Fig. 5) into the box.

When starting to pack a box B, the packer positions the stand 10 as shown in Figs. 1 and 4 so that when the box is placed on top of the stand one of the two compartments (C—1 and C—2), into which the box is divided by a central partition P, is disposed close to the bin 70. In starting to pack the box, the packer completely packs the compartment thus disposed nearest to the bin 70, this compartment, as shown in Fig. 5, being compartment C—1. When this compartment has been completely filled with fruit, the packer lifts up on the low side of the conveyor section 12, thereby lifting the latch 52 until the latch 53 is brought downward onto the tube 22 and the latch 52 is lifted above the tube 21 so that the expansive force of the spring 60 snaps the latch 52 outwardly over the tube 21 as shown in Fig. 2. This automatically returns the conveyor section 12 to and retains it in level position as shown in this figure and lifts the friction shoes 56 and 57 from the floor, thus freeing the packing stand 10 so that it may now be rotated on its casters 18 to position the other compartment, C—2, of the box B adjacent the packing bin 70. This rotation of the packing stand is accomplished (as shown in Fig. 5) by the packer's seizing the box and turning it end-for-end as indicated by the arrow A. When the box is thus turned, the box bottom engages certain of the flanges 42 and 43 and imparts rotation to the stand 10 through these flanges. After the stand has thus been rotated into its new position with the compartment C—2 adjacent the bin 70, the packer applies her foot to the latch 53, forcing this inwardly from over the tube 22 and then downwardly to bring the rubber friction shoes 57 against the floor. The downward movement of the latch 53 tilts the conveyor section 12 laterally so as to bring the flanges 42 into lowered position. The packer now shifts the box into contact with the flanges 42 and proceeds to pack fruit in compartment C—2.

When this compartment has been filled with fruit, the box is entirely packed and ready for lidding. The packer then lifts the low side of the conveyor section 12 until the latch 52 is brought downwardly against the tube 21 and the latch 53 is raised to a point above the tube 22 and is caused by the spring 60 to snap outwardly above this tube, thereby locking the conveyor section 12 in level position as shown in Fig. 2. The friction shoes 56 and 57 are now both out of contact with the floor and the operator pushes the packing stand 10 close to a conveyor belt 65 (see Fig. 5), which is usually traveling as indicated by the arrow 66, on substantially the same level or a slightly lower level than that on which the bottom of the box is located when resting on the conveyor section 12 with the latter disposed horizontally (as shown in Fig. 2).

The packer now pushes the fully packed box over the conveyor rollers 41 and onto the conveyor 65. She then places another empty box on the packing stand 10, rocks this into tilted position as shown in Fig. 4, and continues her packing in accordance with the process just described.

I claim:

1. In a packing stand, the combination of: a frame; a set of casters on said frame for supporting said stand; a conveyor section rockably mounted on said frame; idle rollers on said section to rollably support a box being packed; means for setting said section in level or laterally tilted positions; and flanges on said rollers which extend upwardly into a position to be engaged by a box resting on said conveyor section and to resist rotation of said box relative to said packing stand whereby the latter may be rotated by placing the hands on the box.

2. In a packing stand, the combination of: a frame including a pair of inverted U-shaped unitary end members; cross bars connecting lower ends of the legs of said members and a pivot bar connecting the upper ends of said members; a set of casters provided on the lower ends of said legs; a conveyor section pivotally mounted on said pivot bar so as to be rockable between level and two oppositely tilted positions; two pairs of supporting rods pivotally connected to said conveyor section, each pair of said rods being adapted to rest on the floor when said conveyor section is in one of said tilted positions and to be held against the floor by the weight of a box on said conveyor section; and latch means associated with said rods for holding said table in level position.

3. In a packing stand, the combination of: a frame including a pair of inverted U-shaped unitary end members, each of said members providing a pair of legs; cross bars connecting lower ends of the legs of said members and a pivot bar centrally connecting the upper ends of said members; a set of casters provided on the lower ends of said legs; an idle roller conveyor section pivotally mounted on said pivot bar so as to be rockable between level and laterally tilted positions; supporting rods pivotally connected to said conveyor section and adapted in one position to rest on the floor with said conveyor section tilted laterally and held in said position by the weight of a box on said conveyor section; latch means associated with said rods for holding said table in level position; and flanges provided on opposite ends of the idle rollers of said conveyor section to retain said box in substantial alignment with said section when said section is level and when said section is tilted.

4. In a packing stand, the combination of: a frame including a pair of inverted U-shaped unitary end members, each of said members including a pair of legs connected at their upper ends by an arch, the upper portions of said legs being relatively close together and the lower portions thereof being spread outwardly; cross bar means connecting lower spread portions of said legs; a pivot bar centrally connecting said arches; an idle roller conveyor section pivotally mounted on said pivot bar, said conveyor section longitudinally overlapping opposite ends of said frame; casters provided on the lower ends of said legs; two foot-operated latch frames pivotally connected to said conveyor section and extending downwardly adjacent said upper leg portions, each one of said latch frames engaging the floor when said conveyor section is tilted in the direction of that particular latch frame when the latter is released to permit said tilting, said two latch frames being adapted to prevent rotation of said conveyor section on said pivot bar when said conveyor section is returned to level position; and means on said conveyor section for retaining a box in substantial alignment with said section.

5. In a packing stand, the combination of: a body frame; casters on which said frame is rollably supported; a conveyor section pivotally mounted on a central longitudinal axis on said frame; two latch frames pivotally connected to said conveyor section on opposite sides of said axis, each of said latch frames coming in contact with the floor when said conveyor is tilted a given angle in the direction of that latch frame; and latch means for automatically latching said conveyor against rotation about its pivotal axis when said conveyor is brought into horizontal position, said latch means being adapted to be foot-operated from either side of said packing stand in order to release said conveyor from its horizontal position and permit it to be tilted toward that side of said stand.

6. A combination as in claim 5 in which each of said latch frames includes upright members pivotally connected to said conveyor section and a latch member secured at its opposite ends to said upright members, and in which said latch means includes said latch members, body frame cross-members disposed adjacent thereto and outside of said latch members, and a spring constantly urging said latch members apart.

7. In a packing stand, the combination of: a frame; a set of casters on said frame for rollably supporting said stand; a conveyor section rockably mounted on said frame; idle rollers on said section to rollably support a box being packed; means for setting said section in level or laterally tilted positions; and means on said rollers extending outwardly therefrom beyond the normal diameters of said rollers into position to engage a box resting on said conveyor section to resist rotation of said box relative to said packing stand whereby the latter may be rotated by placing the hands on the box.

GERALD C. PAXTON.